United States Patent
Lim

(10) Patent No.: US 7,079,217 B2
(45) Date of Patent: Jul. 18, 2006

(54) METHOD OF FABRICATING A LIQUID CRYSTAL DISPLAY PANEL

(75) Inventor: Byoung Ho Lim, Kyoungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/026,760

(22) Filed: Dec. 27, 2001

(65) Prior Publication Data
US 2002/0085167 A1    Jul. 4, 2002

(30) Foreign Application Priority Data
Dec. 30, 2000  (KR) ............................... 2000-87049

(51) Int. Cl.
*G02F 1/13*   (2006.01)
*H01L 21/302* (2006.01)
(52) U.S. Cl. .................... 349/187; 438/459; 216/23
(58) Field of Classification Search ............. 349/187, 349/192, 159, 160, 97, 158; 216/23, 80, 216/97, 99, 79, 96; 438/704, 455, 459, 691, 438/30
See application file for complete search history.

(56) References Cited

U.S. PATENT DOCUMENTS

| | | | | |
|---|---|---|---|---|
| 5,766,493 A * | 6/1998 | Shin | ............................. | 216/23 |
| 6,108,063 A * | 8/2000 | Yuuki et al. | ................... | 349/95 |
| 6,197,209 B1 * | 3/2001 | Shin et al. | ..................... | 216/84 |
| 6,391,137 B1 * | 5/2002 | Matsushima | ................ | 156/250 |
| 6,508,990 B1 * | 1/2003 | Yoshida et al. | ......... | 422/186.05 |
| 6,675,817 B1 * | 1/2004 | Doh | ........................ | 134/56 R |

FOREIGN PATENT DOCUMENTS

JP    05249422 A    *    9/1993

* cited by examiner

*Primary Examiner*—Kenneth Parker
*Assistant Examiner*—Matthew Landau
(74) *Attorney, Agent, or Firm*—Mckenna Long & Aldridge LLP

(57) ABSTRACT

A method of fabricating a liquid crystal display panel includes preparing an upper substrate and a lower substrate, bonding the upper substrate to the lower substrate, cleaning exposed surfaces of the bonded upper and lower substrates, and eliminating the exposed surfaces of the bonded upper and lower substrates.

18 Claims, 8 Drawing Sheets

METHOD OF FABRICATING A LIQUID CRYSTAL DISPLAY PANEL

The present invention claims benefit of Korean Patent Application No. P2000-87049 in Korea on Dec. 30, 2000, which is hereby incorporated by reference.

BACKGROUND OF THE INVENTION

1. Field of the Invention

This invention relates to a flat panel display device, and more particularly to a method of fabricating a liquid crystal display panel suitable for providing a picture of high brightness.

2. Description of the Related Art

In general, there are several flat panel display devices including liquid crystal display panels, electro-luminescence panels, and plasma display panels. Among these flat panel display devices, liquid crystal display panels are widely used because of their low power consumption and decreased size. The liquid crystal display panel displays image data corresponding to a video signal by controlling an amount of light passing through a liquid crystal layer.

The liquid crystal display panel device includes a common electrode and a plurality of pixel electrodes for applying an electric field to a liquid crystal layer, and a plurality of switch devices for switching a video signal supplied to each of the plurality of pixel electrodes. Generally, thin film transistors (TFT) are used as the switch devices. The liquid crystal layer controls an amount of light transmitted according to an intensity of the electric field applied between the pixel electrode and the common electrode.

A plurality of TFTs and a plurality of pixel electrodes are formed on a lower substrate. A common electrode is formed on a upper substrate, or the lower substrate in accordance with a method of applying an electric field to the liquid crystal layer. Accordingly, in the case of a liquid crystal display panel device of a horizontal electric field method, the common electrode is disposed on the lower substrate along with the TFT and the pixel electrode. In the case of a liquid crystal display panel device of a vertical electric field method, the common electrode is formed on the upper substrate. In addition, liquid crystal display panel devices for displaying a color picture have a plurality of color filters provided on the lower substrate.

To increase a brightness of a picture, a liquid crystal display panel, as shown in FIG. 1, has a pixel electrode 12 connected to a drain electrode 11 of a TFT 10, a scanning line 16 connected to a gate electrode 15 with an overlapping signal line 14 that is connected with a source electrode 13. Accordingly, a high brightness liquid crystal display panel uses an organic insulating film, thereby increasing an aperture ratio of the pixel electrode. The organic insulating film is formed by coating an organic insulating material on a substrate and curing the coated organic insulating material. However, gases produced by the organic insulating material contaminate a rear of the substrate.

FIGS. 2A to 2F are cross sectional views along A–A' of FIG. 1 showing a manufacturing process for making a high brightness liquid crystal display panel according to the conventional art.

In FIG. 2A, a gate electrode 15 is provided on a transparent substrate 18. Aluminum(Al) or copper(Cu) are deposited on the substrate 18 by a sputtering process to form a metal thin film. Then, the metal thin film is patterned by a photolithographic process, including a wet method, to form the gate electrode 15.

In FIG. 2B, a gate insulating film 19, an active layer pattern 21, and an ohmic contact layer pattern 23 are sequentially deposited on the substrate 18 to cover the gate electrode 15. An insulating material, such as silicon oxide or silicon nitride, is deposited on an entire surface of the substrate 18 including the gate electrode 15 by a chemical vapor deposition (CVD) process to form the gate insulating film 19. Subsequently, an undoped active layer of polycrystalline silicon or amorphous silicon, and an ohmic contact layer of polycrystalline silicon or amorphous silicon doped with an n-type or p-type impurity at a high concentration, are continuously deposited on the gate insulating film 19 by a CVD process. The active layer and the ohmic contact layer is patterned by a photolithographic process that includes anisotropic etching, to remain only at a portion corresponding to the gate electrode 19. Thus, an active layer pattern 21, and an ohmic contact layer pattern 23 are prepared.

In FIG. 2C, drain and source electrodes 11 and 13 are formed on a surface and side portions of and the ohmic contact layer pattern 23, and on a side portion of the active layer pattern 21. Molybdenum (Mo) or a molybdenum alloy such as MoW, MoTa or MoNb, is deposited on the ohmic contact layer 23 and the exposed gate insulating film 19 by CVD or sputtering processes. The deposited metal layer or metal alloy layer is patterned by a photolithographic process, thereby forming the drain electrode 11 and the source electrode 13. During patterning of the drain electrode 11 and the source electrode 13, a portion of the ohmic contact layer pattern 23 corresponding to an upper portion of the gate electrode 15 is removed, thereby exposing a portion of the active layer pattern 21 and forming a channel located between the drain electrode 11 and the source electrode 13.

In FIG. 2D, a protective layer 25 is prepared on an entire surface of the substrate 18 corresponding to the drain electrode 11 and the source electrode 13. Organic insulating material, having small dielectric constant, such as acrylic organic compound, Teflon7, benzocyclobutene (BCB), Cytop7 or perfluorocyclobutane(PFCB), is coated on the substrate 18 by a spin-on-glass method, thereby flattening an upper surface of the protective layer 25. However, the organic insulating material can unnecessarily adhere to the rear of the substrate 18 during processing. Accordingly, a rear of the substrate 18 is contaminated with an impurity 25A of organic insulating material when the protective layer 25 of organic insulating material is formed.

In FIG. 2E, the protective layer is patterned by a photolithographic process to form a contact hole 17a, thereby exposing a portion of the drain electrode 11.

In FIG. 2F, a transparent electrode material, such as indium-tin-oxide (ITO), indium-zinc-oxide (IZO) or indium-tin-zinc-oxide(ITZO), is deposited on an entire surface of the protective layer 25 where the contact hole 17a is formed. The transparent electrode material is patterned by a CVD process to form a pixel electrode 12.

In FIG. 3, a tower substrate 18 on which the TFT and the pixel electrode are formned, is bonded to an upper substrate 28 on which a common electrode (not shown) and/or color filters (not shown) are prepared. Before bonding the lower substrate 18 to the upper substrate 28, an alignment film (not shown) is printed on the lower substrate 18 for the injection of liquid crystal molecules, and then the printed alignment film (not shown) is rubbed. A sealant 27 is formed to provide cell gap at an edge portion of a surface of the lower substrate 18 where the alignment film (not shown) is prepared. Accordingly, another alignment film (not shown) is formed to cover the common electrode (not shown) on the upper substrate 28, and is rubbed. Thus, the lower substrate 18 is bonded to the upper substrate 28, thereby creating a space between the lower and upper substrates 18 and 28. Furthermore, the alignment film (not shown) formed on the upper substrate 28 faces the alignment film (not shown) on the lower substrate 18.

In FIG. 4, the bonded surface of the upper substrate 28 and rear of the lower substrate 18 are etched to reduce a thickness of the liquid crystal display panel. However, the rear of the lower substrate 18 and the surface of the upper substrate 28, is not uniformly etched due to contamination from the organic insulating material. Accordingly, a stain 25B is created by projection at a place where the contamination resides, thereby distorting image data. To prevent creation of the stain 25B, a grinding process is used on the surface of the upper substrate 28 and the rear of the lower substrate 18. However, the grinding process does not result in a liquid crystal display panel having a uniform thickness. Moreover, the grinding process is performed manually, thereby decreasing an efficiency of the fabrication process.

SUMMARY OF THE INVENTION

Accordingly, the present invention is directed to a method of fabricating a liquid crystal display panel that substantially obviates one or more of the problems due to limitations and disadvantages of the related art.

An object of the present invention is to provide a fabricating method of a liquid crystal display panel with high brightness and a reduced profile.

Another object of the present invention is to provide a fabricating method of a liquid crystal display panel having a uniform thickness.

Another object of the present invention is to provide a fabricating method of a liquid crystal display panel with an improved efficiency.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a method of fabricating a liquid crystal display panel includes preparing an upper substrate and a lower substrate, bonding the upper substrate to the lower substrate, cleaning exposed surfaces of the bonded upper and lower substrates, and eliminating the exposed surfaces of the bonded upper and lower substrates.

In another aspect, a method of fabricating a liquid crystal display panel includes bonding an upper substrate to a lower substrate, cleaning exposed surfaces of the bonded upper and lower substrates, and removing the exposed surfaces of the bonded upper and lower substrates.

In another aspect, a method of fabricating a liquid crystal display panel includes forming a gate electrode on a lower substrate, forming a gate insulating film on the lower substrate to cover the gate electrode, forming an active layer on the gate insulating film, and forming a source electrode and a drain electrode on the active layer, bonding an upper substrate to the lower substrate, cleaning exposed surfaces of the bonded upper and lower substrates, and removing the exposed surfaces of the bonded upper and lower substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings;

FIG. 3 is a cross sectional view showing a section of bonded lower and upper substrates according to the conventional at;

DETAILED DESCRIPTION OF THE PREFERRED EMBODIMENTS

FIGS. 5A to 5I are cross sectional views showing an exemplary fabricating method of a liquid crystal display panel according to the present invention.

Figure 1:
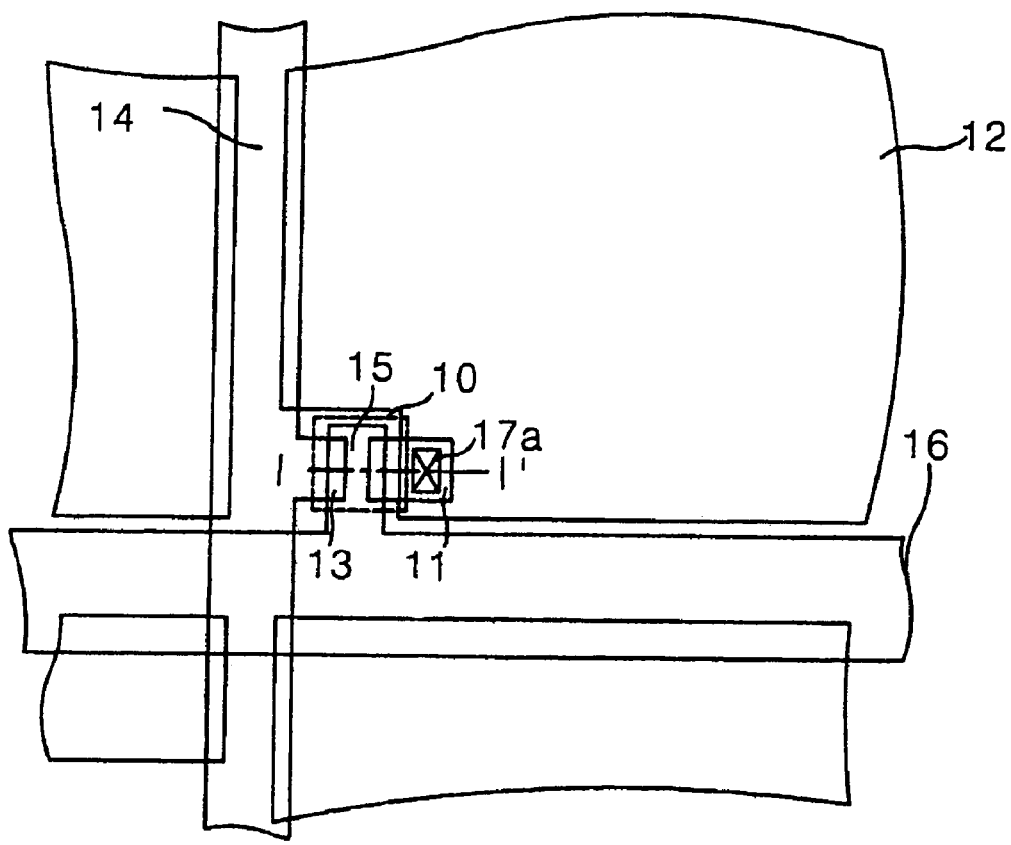
FIG. 1 is a plan view showing a liquid crystal display panel according to the conventional art.
Figure 2A:
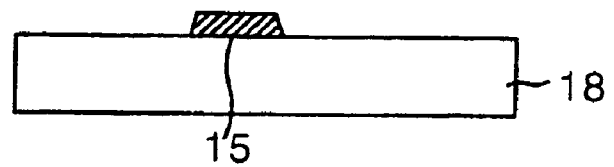
FIGS. 2A to 2F are cross sectional views showing a fabricating method of the liquid crystal display panel along I–I' of FIG. 1.
Figure 2B:
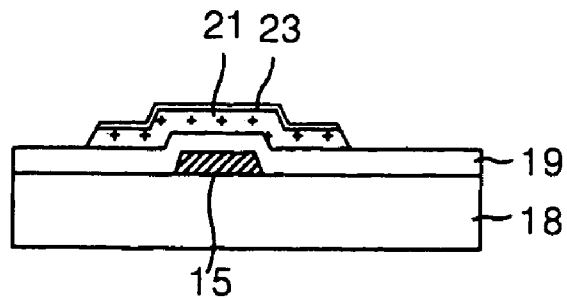
Figure 2C:
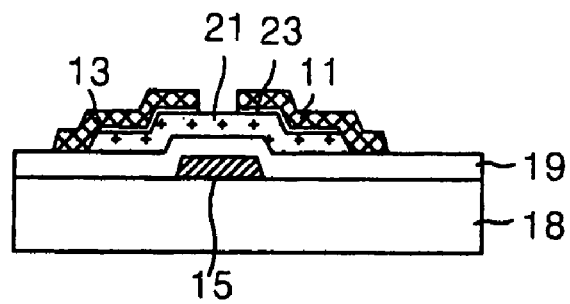
Figure 2D:
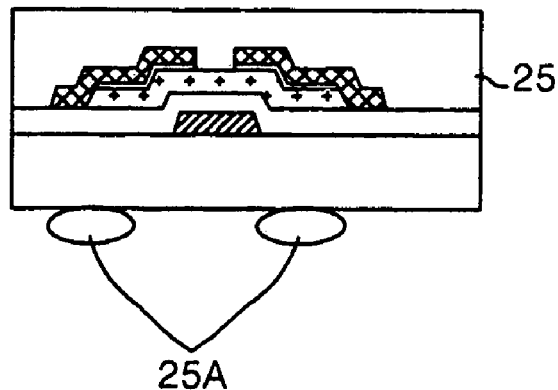
Figure 2E:
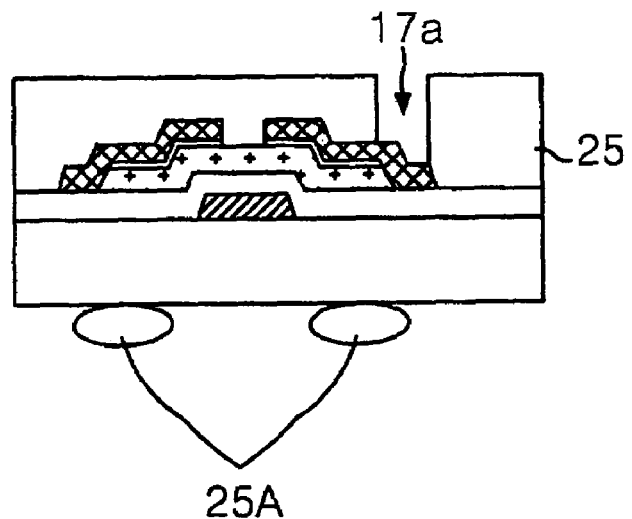
Figure 2F:
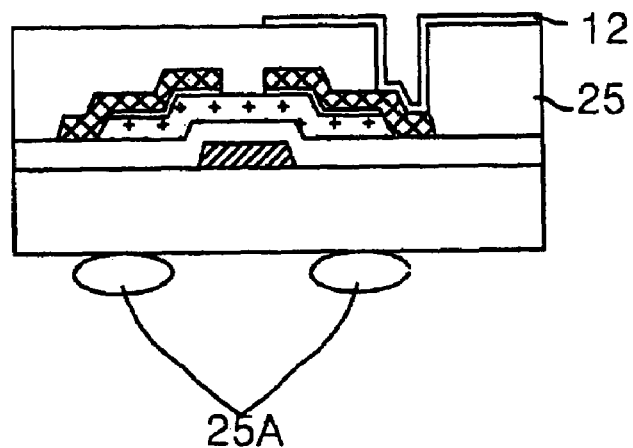
Figure 3:
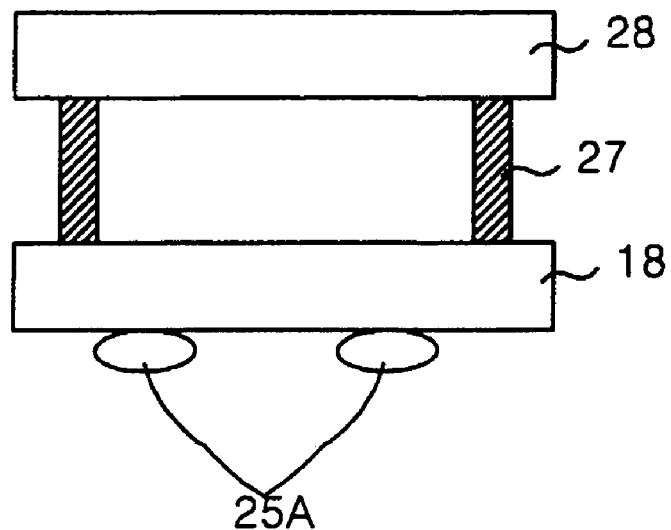
Figure 4:
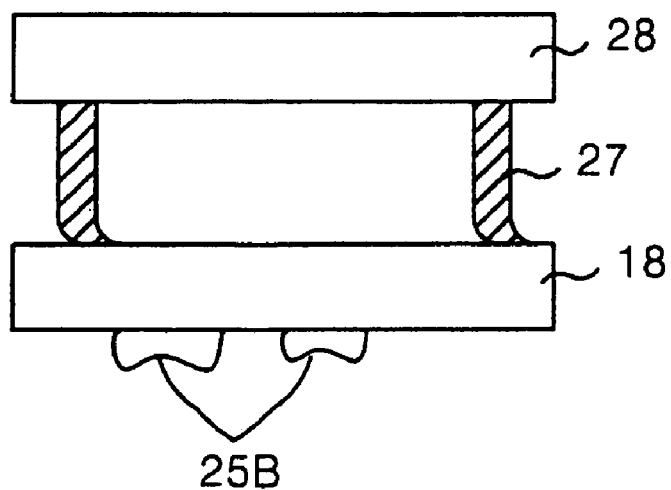
FIG. 4 is a cross sectional view showing an etching process of bonded lower and upper substrates according to the conventional art.
Figure 5A:
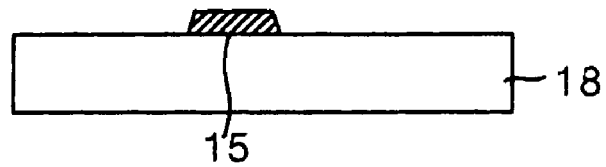
FIGS. 5A to 5I are cross sectional views showing an exemplary fabricating method of a liquid crystal display panel according to the present invention.

In FIG. 5A, a gate electrode 15 may be formed on a lower substrate 18. Aluminum (Al) or copper (Cu), may be deposited on the substrate 18 by a sputtering process, for example, thereby forming a metal thin film on the substrate 18. Then, the metal thin film may be patterned by a photolithographic process including a wet etching method, for example, thereby forming a gate electrode 15.

Figure 5B:
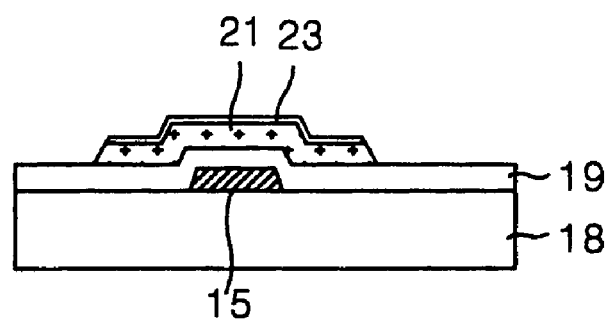

In FIG. 5B, a gate insulating film 19, an active layer pattern 21, and an ohmic contact layer pattern 23 may be sequentially deposited on the substrate 15 to cover the gate electrode 15. Insulation material such as silicon oxide or silicon nitride, for example, may be deposited by a CVD process, for example, on an entire surface of the substrate 18 having the gate electrode 15, thereby forming the gate insulating film 19. Subsequently, an active layer of undoped amorphous silicon or polycrystalline silicon, for example, and an ohmic contact layer of amorphous silicon or polycrystalline silicon doped with an n-type or p-type impurity at a high concentration, for example, may be deposited on the gate insulating film 19 by a CVD process, for example. The deposited active and ohmic contact layers are patterned by a photolithographic process including an anisotropic etching process, thereby forming the active layer pattern 21 and the ohmic contact layer pattern 23.

Figure 5C:
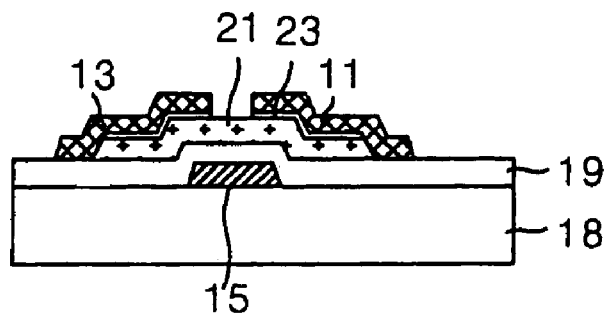

In FIG. 5C, drain and source electrodes 11 and 13 may be formed on surface and side portions of the ohmic contact layer pattern 23, and on a side portion of the active layer pattern 21. Molybdenum (Mo) or a molybdenum alloy such as MoW, MoTa or MoNb, for example, may be deposited on the ohmic contact layer 23 and an exposed portion of the gate insulating film 19 by CVD or sputtering processes. The deposited metal layer or metal alloy layer may be patterned by a photolithographic process, thereby forming the drain and source electrodes 11 and 13. In addition, when the drain and source electrodes 11 and 13 are patterned, a portion of the ohmic contact layer pattern 23 corresponding to an upper portion of the gate electrode 19 may be removed, thereby exposing a channel region of the active layer pattern 21 between the drain electrode 11 and the source electrode 13.

Figure 5D:
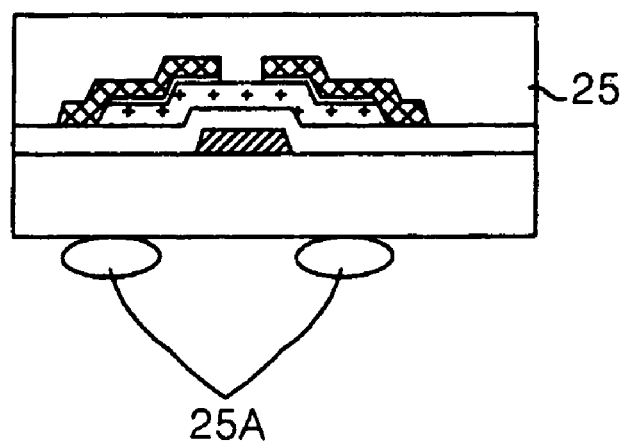

In FIG. 5D, a protective layer(25) may be prepared on an entire surface of the substrate 18 on which the drain electrode 11 and the source electrode 13 are formed. An organic insulating material having small dielectric constant, such as an acrylic organic compound of Teflon7, benzocyclobutene (BCB), Cytop7 or perfluorocyclobutane (PFCB), for example, may be made coated on the substrate 18 by a spin-on-glass method, for example, to flatten an upper surface of the protective layer 25. However, the organic insulating material can unnecessarily adhere to a rear of the substrate 18. Accordingly, the rear of the substrate 18 is contaminated with an impurity 25A of organic insulating material when the protective layer 25 is formed.

Figure 5E:
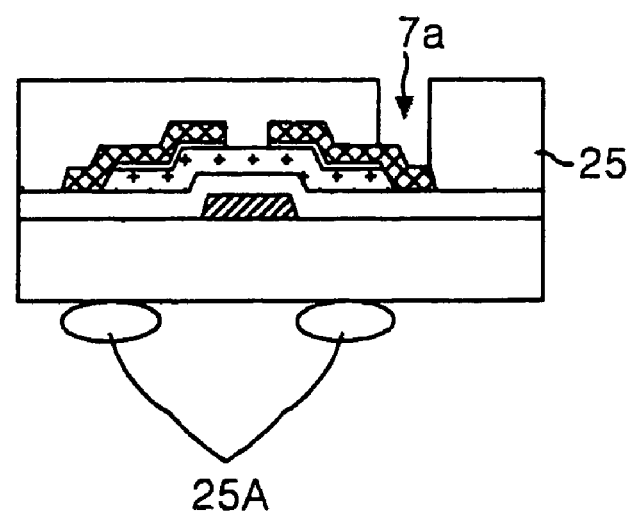

In FIG. 5E, the protective layer 25 may be patterned by a photolithographic process, thereby forming a contact hole 17a exposing a portion of the drain electrode 11. A transparent electrode material, such as ITO, IZO or ITZO, for example, may be deposited on an entire surface of the protective layer 25 where the contact hole 17a is formed.

Figure 5F:
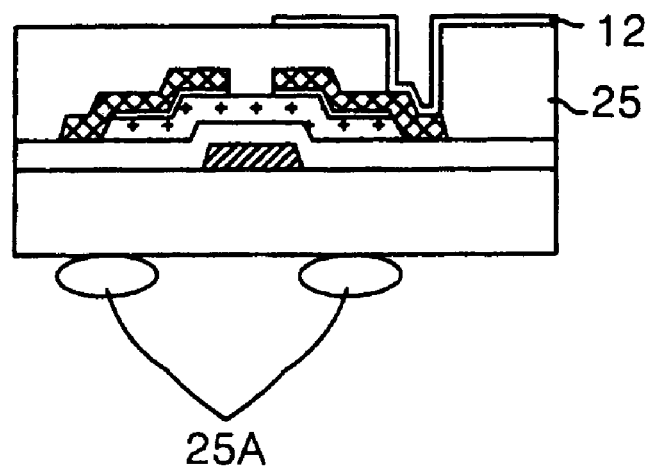

In FIG. 5F, the transparent electrode material may be patterned by a CVD process, thereby forming a pixel electrode 12 on the protective layer 25.

Figure 5G:
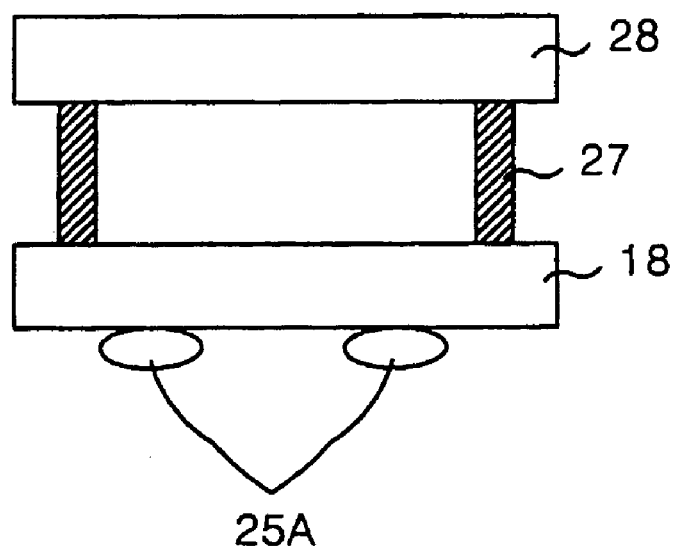

In FIG. 5G, an alignment film (not shown) for aligning liquid crystal cells may be printed on an upper portions of the protective layer 25 and the pixel electrode 12 formed on the lower substrate 18, and then rubbed. A sealant 27 may be formed to provide a cell gap on an edge of a surface of the lower substrate 18 where the alignment film is prepared. While the lower substrate 18 is fabricated, an upper substrate 28 is also prepared. A common electrode (not shown) and/or color filters (not shown) may be formed on the upper substrate 28. Upon the preparation of the common electrode (not shown) and/or the color filers (not shown), the alignment film (not shown) may be printed, for example, on the upper substrate 28. The alignment film on the upper substrate 28 is also rubbed. Thus, the lower substrate 18 is bonded to The upper substrate 28, thereby creating a space therebetween. Accordingly, the alignment film on the upper substrate 28 faces the alignment film on the lower substrate 18.

Figure 5H:
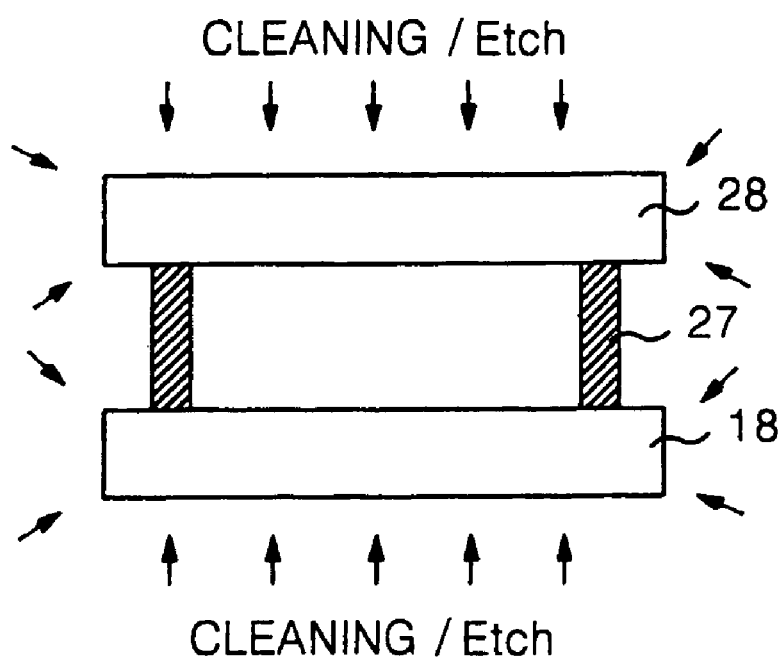

In FIG. 5H, the bonded surface of the upper substrate 28 and rear of the lower substrate 18 may be cleaned, thereby removing an impurity 25A of the organic insulating material. Moreover, the bonded surface of the upper substrate 28 and the rear of the lower substrate 18 may be dry-etched to have the impurity 25A completely removed.

Figure 5I:
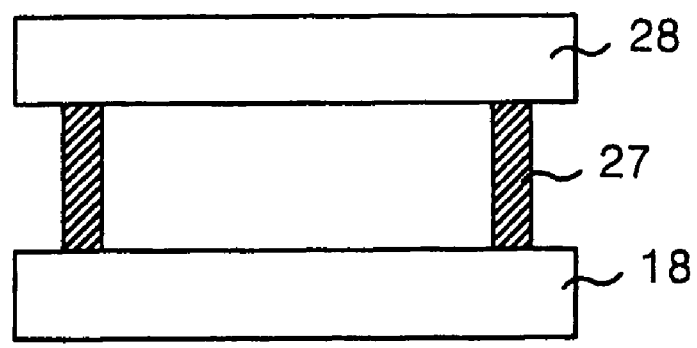

In FIG. 5I, the lower and upper substrates 18 and 28 may be wet-etched while being dipped in an etching liquid, for example, to reduce a thickness of the lower and upper substrates 18 and 28. Accordingly, a thickness of the liquid crystal display panel from the bonded surface of the upper substrate 28 to the bonded rear of the lower substrate 18 is reduced by the wet etching. In addition, the impurity 25A may be removed in advance of the wet-etching so that the rear of the lower substrate 18 and the surface of the upper substrate 28, thereby preventing formation of a stain.

It will be apparent to those skilled in the art that various modifications and variations can be made in the method of fabricating a liquid crystal display panel of the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display panel, comprising the steps of:
    preparing an upper substrate and a lower substrate;
    bonding the upper substrate to the lower substrate;
    cleaning exposed surfaces of the bonded upper and lower substrates to remove foreign materials formed on the lower substrate during the preparing of the lower substrate; and
    simultaneously eliminating the cleaned exposed surfaces of the bonded upper and lower substrates,
    wherein the step of cleaning exposed surfaces includes dry-etching.

2. The method according to claim 1, wherein the step of eliminating the exposed surfaces includes wet-etching.

3. The method according to claim 1, further including the steps of:
    forming a thin film transistor on the lower substrate;
    forming a protective layer on the lower substrate; and
    forming a pixel electrode on the protective layer to electrically contact the thin film transistor.

4. The method according to claim 3, wherein the pixel electrode is formed of a transparent conductive material including one of indium-tin-oxide (ITO), indium-zinc-oxide (IZO), and indium-tin-zinc-oxide (ITZO).

5. The method according to claim 3, wherein the protective layer is formed of an organic insulating material including one of an acrylic organic compound, fluorinated polymer, benzocyclobutene (BCB), and perfluorocyclobutane (PFCB).

6. The method according to claim 3, wherein the step of forming the thin film transistor includes:
    forming a gate electrode on the lower substrate;
    forming a gate insulating film on the lower substrate to cover the gate electrode;
    forming an active layer on the gate insulating film; and
    forming a source electrode and a drain electrode on the active layer.

7. The method according to claim 6, wherein the source electrode and drain electrode contact the gate insulating film.

8. The method according to claim 6, wherein the pixel electrode contacts flat and inclined surfaces of the drain electrode via a contact hole to expose the drain electrode.

9. A method of fabricating a liquid crystal display panel, comprising the steps of:
    bonding an upper substrate to a lower substrate;
    cleaning exposed surfaces of the bonded upper and lower substrates to remove foreign materials formed on the lower substrate during preparation of the lower substrate; and
    simultaneously removing the cleaned exposed surfaces of the bonded upper and lower substrates,
    wherein the step of cleaning exposed surfaces includes dry-etching.

10. The method according to claim 9, wherein the step of removing the exposed surfaces includes wet-etching.

11. The method according to claim 9, wherein the step of removing the exposed surfaces uniformly reduces a thickness of the liquid crystal display panel.

12. A method of fabricating a liquid crystal display panel, comprising the steps of:
    forming a gate electrode on a lower substrate;

forming a gate insulating film on the lower substrate to cover the gate electrode;

forming an active layer on the gate insulating film;

forming a source electrode and a drain electrode on the active layer;

forming a protective layer on the lower substrate;

bonding an upper substrate to the lower substrate;

cleaning exposed surfaces of the bonded upper and lower substrates to remove foreign materials formed on the lower substrate during the forming of the protective layer; and simultaneously removing the cleaned exposed surfaces of the bonded upper and lower substrates, wherein the step of cleaning exposed surfaces includes dry-etching.

13. The method according to claim 12, wherein the step of removing the exposed surfaces includes wet-etching.

14. The method according to claim 12, further including the step of forming a pixel electrode on the protective layer to electrically contact the drain electrode.

15. The method according to claim 14, wherein the pixel electrode is formed of a transparent conductive material including one of indium-tin-oxide (ITO), indium-zinc-oxide (IZO), and indium-tin-zinc-oxide (ITZO).

16. The method according to claim 12, wherein the protective layer is formed of an organic insulating material including one of an acrylic organic compound, fluorinated polymer, benzocyclobutene (BCB), and perfluorocyclobutane (PFCB).

17. The method according to claim 12, wherein the step of removing the exposed surfaces uniformly reduces a thickness of the liquid crystal display panel.

18. The method according to claim 1, wherein the step of simultaneously eliminating the exposed surfaces of the bonded upper and lower substrates uniformly reduces a thickness of the liquid crystal display panel.

* * * * *